United States Patent
Wedel

(10) Patent No.: US 6,633,501 B2
(45) Date of Patent: Oct. 14, 2003

(54) INTEGRATED CIRCUIT AND CIRCUIT CONFIGURATION FOR SUPPLYING POWER TO AN INTEGRATED CIRCUIT

(75) Inventor: Armin Wedel, Mering (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/078,149

(22) Filed: Feb. 19, 2002

(65) Prior Publication Data

US 2002/0088997 A1 Jul. 11, 2002

Related U.S. Application Data

(63) Continuation of application No. PCT/DE00/02792, filed on Aug. 17, 2000.

(30) Foreign Application Priority Data

Aug. 17, 1999 (DE) .......................................... 199 38 890

(51) Int. Cl.⁷ ................................................. G11C 7/00
(52) U.S. Cl. ...................... 365/195; 365/196; 257/922; 713/194

(58) Field of Search ................................. 365/195, 196; 257/922; 713/193, 194, 200

(56) References Cited

U.S. PATENT DOCUMENTS

| | | | | |
|---|---|---|---|---|
| 4,811,288 A | * | 3/1989 | Kleijne et al. | 365/52 |
| 5,877,547 A | | 3/1999 | Rhelimi | 257/679 |
| 5,880,523 A | * | 3/1999 | Candelore | 257/679 |
| 5,948,102 A | | 9/1999 | Wuidart | 713/200 |
| 6,292,898 B1 | * | 9/2001 | Sutherland | 713/200 |

FOREIGN PATENT DOCUMENTS

| | | |
|---|---|---|
| DE | 19610070 A1 | 9/1997 |
| DE | 19752695 A1 | 6/1999 |
| EP | 0509567 A2 | 10/1992 |
| EP | 0718794 B1 | 12/1995 |
| GB | 2288048 A | 10/1995 |

* cited by examiner

Primary Examiner—Son Mai
(74) Attorney, Agent, or Firm—Laurence A. Greenberg; Werner H. Stemer; Gregory L. Mayback

(57) ABSTRACT

An integrated circuit for processing security-relevant data has data output circuits and access control circuits wherein a disturbance of the power supply of the access control circuits results in a blocking of the data output circuits.

11 Claims, 1 Drawing Sheet

INTEGRATED CIRCUIT AND CIRCUIT CONFIGURATION FOR SUPPLYING POWER TO AN INTEGRATED CIRCUIT

CROSS-REFERENCE TO RELATED APPLICATION

This application is a continuation of copending International Application No. PCT/DE00/02792, filed Aug. 17, 2000, which designated the United States.

BACKGROUND OF THE INVENTION

Field of the Invention

The invention relates to an integrated circuit for processing security-relevant data having data output circuits and access control circuits. The invention also relates to a circuit configuration for supplying power to security-relevant parts of an integrated circuit.

Integrated circuits used in smart cards containing security-relevant data can be the target of a wide variety of attacks on the security-relevant data contained in the integrated circuits.

Physical attacks on smart cards can have various goals, such as reading-out (probing) of secret signals or forcing of control signals.

Therefore, in security technologies, secret signals and control signals are conducted in mask planes that are difficult to access, and are additionally protected by a shielding layer (a so-called security layer).

Over and above the methods of probing and forcing, however, it is also possible to isolate circuit blocks from the supply in order deliberately to generate "stuck at" errors on control signals and thus to cancel e.g. blockade functions.

In order to defend against such attacks in which access control circuits on an IC (Integrated Circuit) are deliberately rendered voltageless, the supply of such access control circuits has hitherto been routed or conducted twice (both in the aluminum plane and in the diffusion plane). In accordance with the prior art, such an attack described above could thus be warded off by routing or conducting the supply to the access control circuits in inseparable layers (planes of the IC) for example in the diffusion plane.

Routing or conducting the supply twice has the disadvantage that a considerable amount of space on the IC is lost, since signals could otherwise be conducted in the diffusion. Conducting the power supply exclusively in the diffusion has the disadvantage that the electrical resistance of the diffusion layer is usually higher. Therefore, either voltage drops occur, or it is necessary to provide tracks of appropriate width in the diffusion, which again leads to a considerable loss of space.

SUMMARY OF THE INVENTION

It is accordingly an object of the invention to provide an integrated circuit for processing security-relevant data and a circuit configuration for supplying power to security-relevant parts of an integrated circuit which overcome the above-mentioned disadvantages of the heretofore-known circuits of this general type and in which, while maintaining or improving the security, the space required for a power supply of security-relevant parts of the IC is reduced wherein the power supply is additionally or exclusively conducted in the diffusion.

With the foregoing and other objects in view there is provided, in accordance with the invention, in combination with an integrated circuit having security-relevant parts and access control circuits for protecting the security-relevant parts, a circuit configuration for supplying power to the security-relevant parts, the circuit configuration including:
 a power supply circuitry for supplying power to the security-relevant parts; and
 the power supply circuitry being laid out such that a power supply to the security-relevant parts is interrupted if a power supply to the access control circuits is disturbed.

In other words, the object of the present invention is achieved through the use of a circuit configuration for the power supply of security-relevant parts of an integrated circuit, which are protected by corresponding access control circuits, wherein the power supply of the security-relevant parts is conducted or routed in such a way that the power supply is interrupted if the power supply of the access control circuits is disturbed.

The object of the invention is thus achieved by virtue of the fact that a disturbance of the power supply of the access control circuits leads to a blocking of the data output circuits.

In this case, a particularly simple solution is possible if the power supply of the security-relevant parts is connected to the power supply of the access control circuits.

Greater security is afforded by a solution in which the power supply of the security-relevant parts is conducted via one or more switches which open if the power supply of the access control circuits is disturbed. In this way, it is possible to prevent the forcible re-establishment of a power supply of the security-relevant parts while the power supply of the access control circuits is interrupted.

In this case, it is particularly preferred for an NMOS (Negative-Channel Metal Oxide Semiconductor) switch to be provided between the general power supply $V_{DD}$ and the power supply of the security-relevant parts, the gate of which is connected to the $V_{DD}$ power supply of the access control circuits via a line routed in the diffusion or in a security layer.

Even greater security of the integrated circuits can preferably be achieved, in conjunction, naturally, with a somewhat higher outlay, through a combination of the security measures described above.

With the objects of the invention in view there is also provided, an integrated circuit for processing security-relevant data, including:
 data output circuits; and
 access control circuits operatively connected to the data output circuits such that a disturbance in a power supply to the access control circuits results in a blocking of the data output circuits.

One possible preferred embodiment of this solution is based on the fact that blocking signals are generated by the access control circuits, which are respectively inverse in pairs, and the data output circuits operate only when in each case both inverse blocking signals indicate cancellation of the blocking. If one of the power supplies of the access control circuit is interrupted, one of the blocking signals inevitably assumes a "false" value, as a result of which the data output is blocked.

In this case, it is particularly preferred for the respectively mutually associated inverse blocking signals to be conducted parallel to one another in the integrated circuit, preferably one above the other. This makes it more difficult to attack an individual blocking signal.

Furthermore, it is preferred for the blocking signals to be conducted in the diffusion or in a security layer. Otherwise, deblocking of the data output circuits could be achieved through an attack on the blocking signals, although with some outlay.

Another preferred development of the invention is based on the power supply of the data output circuits being conducted in such a way that the power supply is interrupted if the power supply of the access control circuit is disturbed.

For this purpose, the power supply of the data output circuits may preferably be connected to the power supply of the access control circuits. This is a very simple possibility for protecting the integrated circuit against the abovementioned manipulations.

Even greater security is afforded by the preferred solution, in which the power supply of the data output circuits is conducted via one or more switches which open if the power supply of the access control circuits is disturbed. In this way, it is also possible to avoid the situation where the power supply of the data output circuit is re-established by placing an electrically conductive needle onto corresponding regions of the IC, even though the power supply of the access control circuits is disturbed.

In this case, particularly preferred is a solution wherein an NMOS switch is provided between the general supply voltage $V_{DD}$ and the power supply of the data output circuits, the gate of which is connected to the $V_{DD}$ power supply of the access control circuits via a line routed in the diffusion or in a security layer.

Other features which are considered as characteristic for the invention are set forth in the appended claims.

Although the invention is illustrated and described herein as embodied in an integrated circuit and a circuit configuration for the power supply of an integrated circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
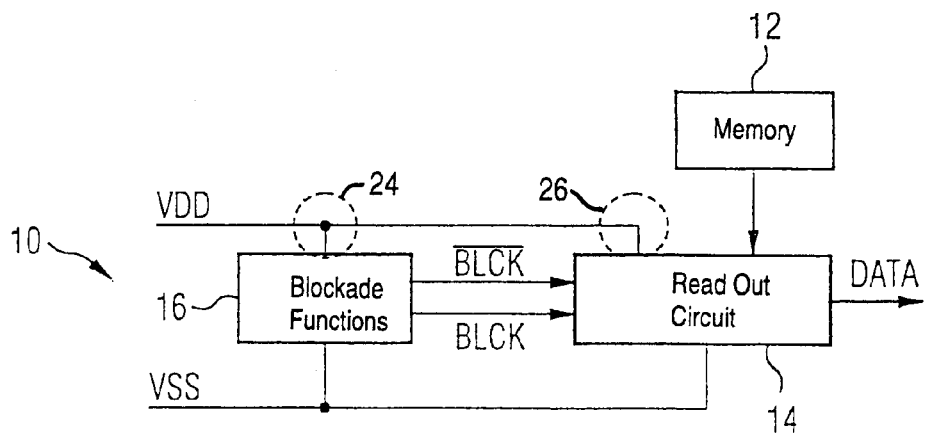
FIG. 1 is a schematic circuit diagram of a part of an integrated circuit in which all of the security features proposed according to the invention are provided in parallel.

Referring now to the figures of the drawings in detail and first, particularly, to FIG. 1 thereof, there is shown a schematic block diagram of an IC in whose memory 12 security-relevant data are stored. The integrated circuit 10 is thus provided with a memory 12, which is connected to a read-out circuit 14. The read-out circuit 14 conducts the data read from the memory 12 to the output designated by "Data".

Furthermore, a block with access control circuits 16 is provided, which contains the corresponding blockade functions. These functions ensure that, for example, only the authorized user, after inputting a password, can access the data stored in the memory 12.

As illustrated in FIG. 1, the power supply of the access control circuits 16 and of the read-out circuit 14 is provided in such a way that both branches of the power supply, $V_{DD}$ and $V_{SS}$, are conducted firstly to the access control circuits 16 and then to the read-out circuit 14. A simple interruption of $V_{DD}$ or $V_{SS}$ upstream of the access control circuits 16 automatically also renders the read-out circuit 14 voltageless, so that data can no longer be read from the memory 12.

In this case, the supply potentials $V_{DD}$ and $V_{SS}$ are conducted as usual in the aluminum layer.

This means that, in principle, there would be the possibility of an attack by interrupting $V_{DD}$ upstream and downstream of the blockade functions and separately supplying the read-out circuit through the use of a power supply applied there directly to the aluminum.

In order to avoid this, at the point at which the power supply of the read-out circuit 14 branches from that in the aluminum layer $V_{DD}$, an NMOS switch 18 is additionally connected between $V_{DD}$ and the read-out circuit 14, the gate 20 of which switch is connected to the power supply of the access control circuits 16 in the diffusion plane via a line 22 routed in a security layer or in the diffusion. This ensures that, in the event of any interruption of the power supply to the access control circuits 16, the NMOS switch 18 opens and the read-out circuit 14 becomes de-energized, thereby making it impossible to read the memory 12.

In addition, as illustrated in FIG. 1, provision is made for the enable signal BLCK to be conducted doubly and inversely from the access control circuit 16 to the read-out circuit 14. This means that the signal is present once in positive form as BLCK signal and once in negative form as $\overline{BLCK}$ signal. The read-out circuit can only read out data when both signals are correct. If the power supply to the access control circuits 16 is interrupted, then at least one of these signals becomes "false" and the read-out circuit is blocked. In this case, it does not even depend on whether $V_{DD}$ or $V_{SS}$ is interrupted. The read-out circuit 14 is always blocked. The security can be increased still further by the respectively mutually associated inverse blocking signals being conducted parallel to one another in the integrated circuit and preferably in the diffusion or in a security layer.

According to the invention, then, it is possible to provide the circuit blocks with regard to the supply wiring such that the block which generates the control signal precedes the circuit blocks which generate the secret signals. With the blockade signal, the secret signal is then also destroyed when the supply is disconnected.

As a second measure, it is additionally possible for the inverse blockade signal to be generated in parallel and be concomitantly evaluated when the secret signal is generated. This ensures that both supplies are present at the block which generates the control signal. In this case, the supply within this block must be conducted in inseparable layers. The inverse control signals are advantageously conducted one above the other to the evaluating block, in order to make forcing more difficult.

If the supply is disconnected upstream of the block which generates the control signal, the secret signal is thus inhibited at the same time. In this case, it is not necessary for the supply wiring to be conducted twice between the blocks, and wiring area is gained for the signal wiring.

As an alternative to the measures described, the supply of the block which generates the secret signal can be conducted via a switch which switches on or off depending on the supply of the control block. In this case, it is necessary to conduct a security signal from the supply, inseparable within the control block, to the gate of the switch.

In order to make the physical manipulation possibilities more difficult, the invention proposes with regard to the supply wiring a block configuration which makes a configuration robust with respect to destructive attacks, without giving rise to an additional outlay on supply wiring (redundant supply in diffusion). This block placement will usually appear differently than that of an ad hoc corridor planning which does not consider the boundary conditions described.

The control signals are conducted with their inverse counterparts in a parallel manner from block to block in order to ensure at the evaluating block that both supply polarities are present at the generating block.

As a modification, it is proposed to make the supply of the block to be inhibited dependent on the supply of the control function via a switch, the configuration being configured such that a physical manipulation for generating a "stuck at" error on a control signal does not have a harmful effect. That is associated with an additional outlay on circuitry (addition of a switch) which would not be justified if one did not wish to safeguard against this possibility of manipulation.

FIG. 1 shows, as an exemplary embodiment, a configuration in a memory module in which the data read from the memory 12 are inhibited for a read access through the use of a blockade function. Blockade and read-out circuits are provided in such a way that disconnection of the blockade function from the supply simultaneously disconnects the read-out circuit from the supply and thus blocks the read-out circuit.

The blockade signal BLCK is conducted parallel to its inverse counterpart to the read-out circuit, where both control signals are evaluated.

Figure 2:
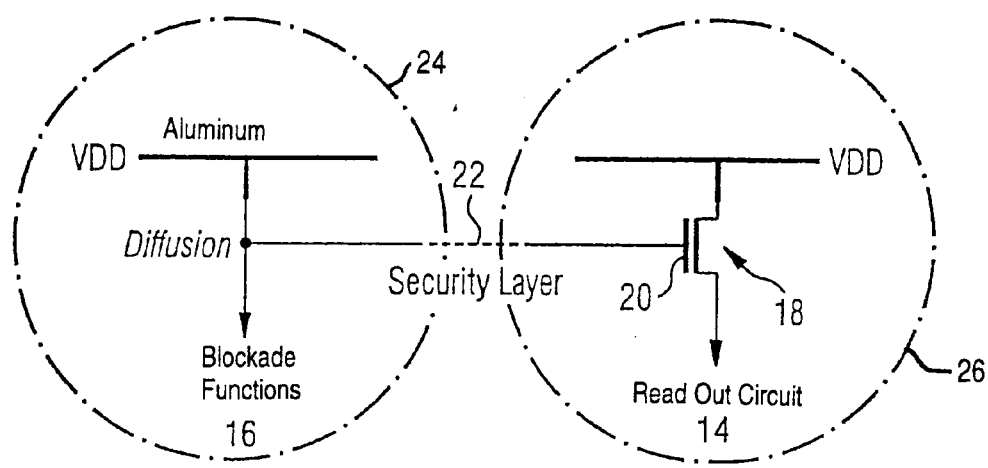
FIG. 2 is a schematic circuit diagram of a detail of the integrated circuit shown in FIG. 1.

FIG. 2 illustrates circuit details 24 and 26 of a specific embodiment of a configuration in which the supplying of the blockade function is conducted or routed in the diffusion region and is supplied to the gate of an NMOS switch which supplies power to the read-out circuit. If the blockade circuit is disconnected from $V_{DD}$, the read-out address is simultaneously decoupled from the supply.

I claim:

1. An integrated circuit for processing security-relevant data, comprising:
    data output circuits; and
    access control circuits operatively connected to said data output circuits such that a disturbance in a power supply to said access control circuits results in a blocking of said data output circuits.

2. The integrated circuit according to claim 1, wherein:
    said access control circuits generate blocking signals such that respective pairs of the blocking signals are inverse blocking signals; and
    said data output circuits operate only when in each case both of the inverse blocking signals indicate a cancellation of the blocking.

3. The integrated circuit according to claim 2, wherein said access control circuits and said data output circuits are configured such that respective mutually associated inverse blocking signals are conducted parallel to one another.

4. The integrated circuit according to claim 2, wherein said access control circuits and said data output circuits are configured such that respective mutually associated inverse blocking signals are conducted parallel to one another and one above the other.

5. The integrated circuit according to claim 2, including a diffusion region conducting the blocking signals.

6. The integrated circuit according to claim 2, including a security layer conducting the blocking signals.

7. The integrated circuit according to claim 2, including a power supply circuitry for said data output circuits, said power supply circuitry being laid out such that a power supply to said data output circuits is interrupted if a power supply to said access control circuits is disturbed.

8. The integrated circuit according to claim 3, including a power supply circuitry for said data output circuits and a power supply circuitry for said access control circuits, said power supply circuitry for said data output circuits being connected to said power supply circuitry for said access control circuits.

9. The integrated circuit according to claim 7, wherein said power supply circuitry for said data output circuits includes at least one switch configured such that a power supply to said data output circuits is conducted via said at least one switch and such that said at least one switch opens if the power supply to said access control circuits is disturbed.

10. The integrated circuit according to claim 9, including:
    a diffusion region;
    a line routed in said diffusion region;
    said at least one switch is an NMOS switch provided between a power supply potential and said data output circuits; and
    said NMOS switch has a gate connected, via said line routed in said diffusion region, to a power supply potential for said access control circuits.

11. The integrated circuit according to claim 9, including:
    a security layer;
    a line routed in said security layer;
    said at least one switch is an NMOS switch provided between a power supply potential and said data output circuits; and
    said NMOS switch has a gate connected, via said line routed in said security layer, to a power supply potential for said access control circuits.

* * * * *